UNITED STATES PATENT OFFICE.

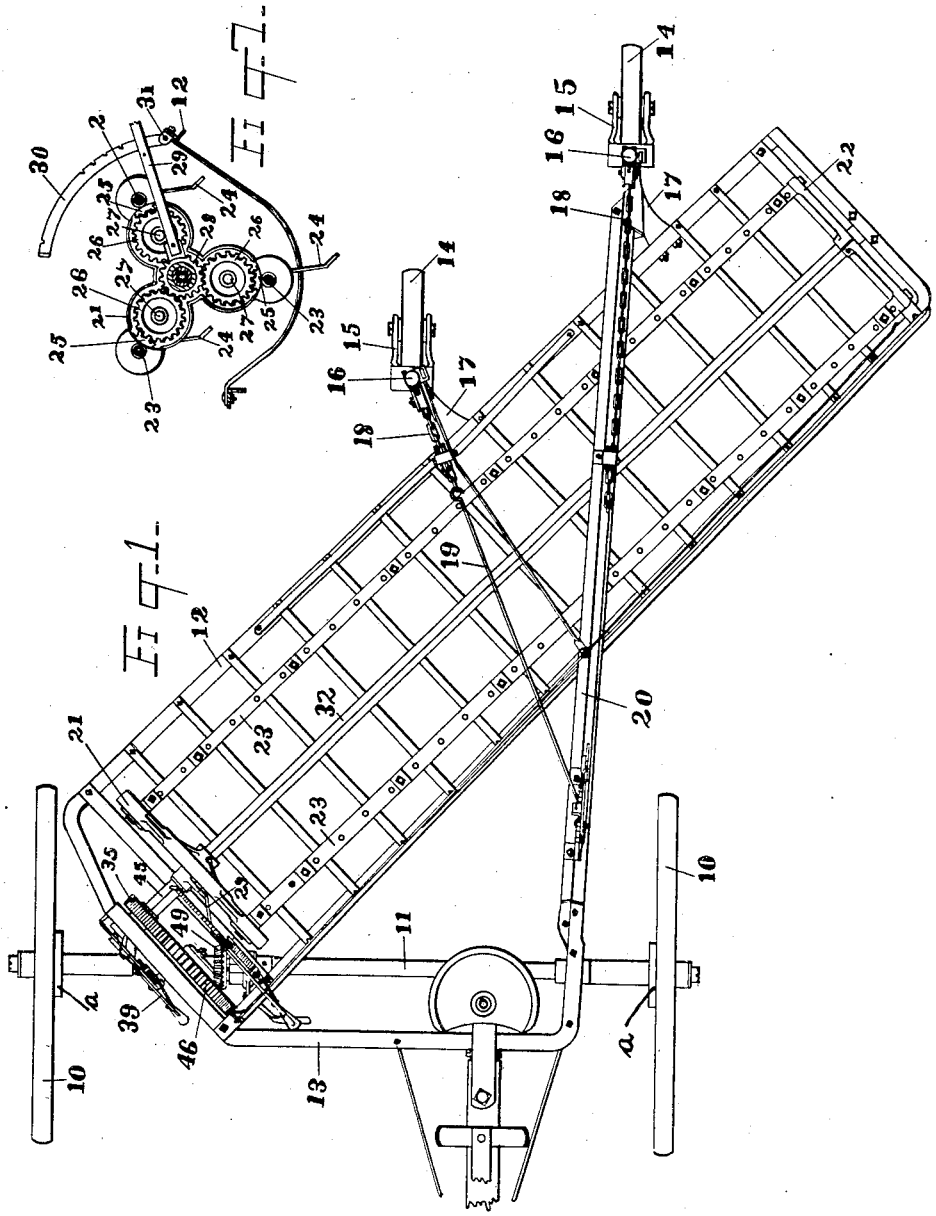

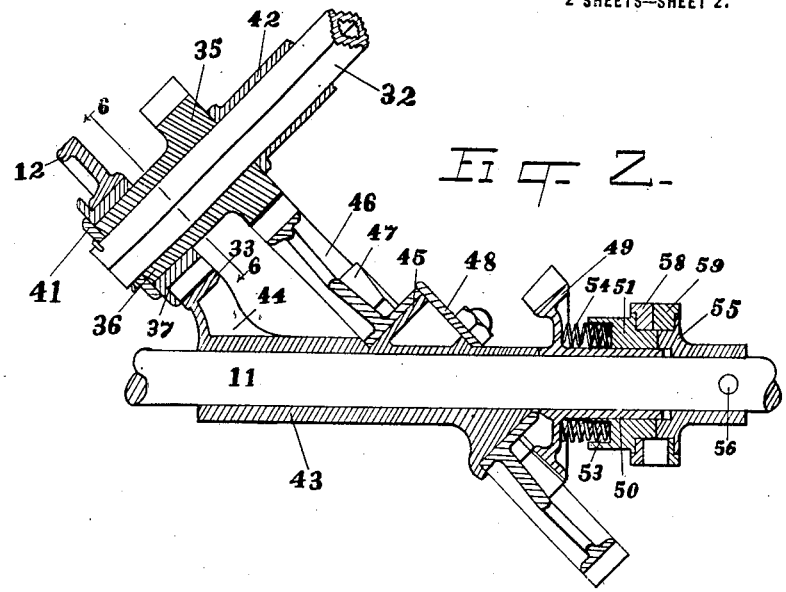
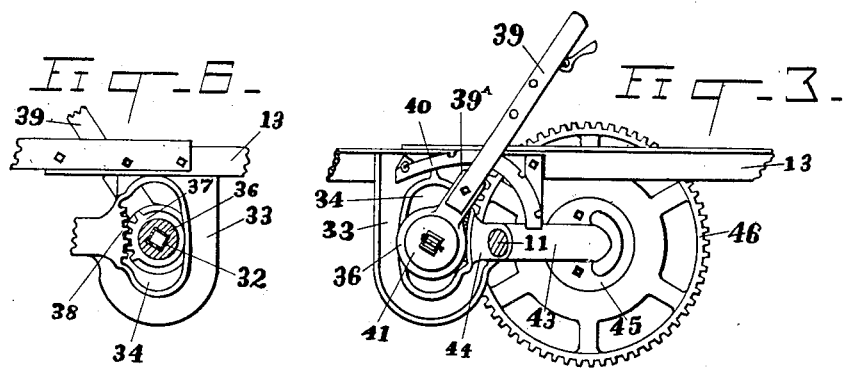
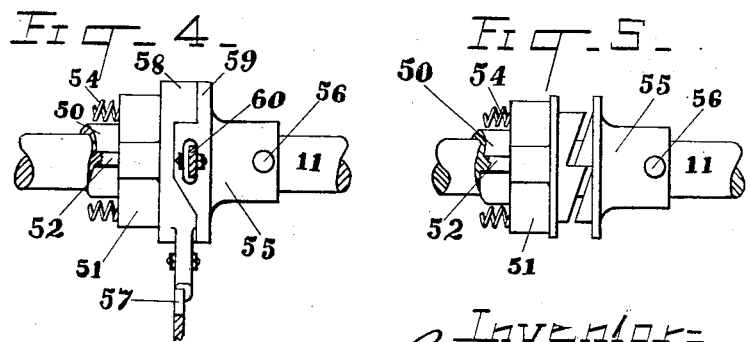

ROBERT R. BOWERS, OF OTTUMWA, IOWA, ASSIGNOR TO THE DAIN MANUFACTURING COMPANY OF IOWA, OF OTTUMWA, IOWA, A CORPORATION OF IOWA.

SIDE-DELIVERY RAKE.

1,371,465. Specification of Letters Patent. Patented Mar. 15, 1921.

Application filed July 10, 1919. Serial No. 309,888.

*To all whom it may concern:*

Be it known that I, ROBERT R. BOWERS, a citizen of the United States, and a resident of Ottumwa, in the county of Wapello and State of Iowa, have invented certain new and useful Improvements in Side-Delivery Rakes, of which the following is a specification, reference being had to the accompanying drawings.

This invention relates to side-delivery rakes of the type wherein a rotary reel is arranged at an angle to the line of draft of a wheeled frame to which the frame of the rotary reel is flexibly secured, the several series of rake-teeth with which the reel is equipped being maintained at the same angle so as to be presented properly to the hay to be raked. Such teeth are held in the desired uniform working position by the use of suitable mechanism carried by the forward or inner reel head and comprising, ordinarily, a set of gears in connection with each tooth-bar and a single other gear that is in mesh with one of the gears of each of said sets of gears.

It has been common practice to provide at the rear of the reel-frame and near its outer end one or more caster-wheels between which and the reel-frame a relative vertical adjustment could be effected,—the said frame during such adjustment rocking about the axle of the machine as an axis. In effecting such an adjustment, it is evident that the outer or rear end of the reel-frame and the reel that is supported thereby will move through a greater arc than the front end of the frame and reel, and it is considered desirable in some instances that such other end of the reel be given a greater adjustment than is possible to attain by the character of adjustment above referred to. Attempts have been made to accomplish this by giving to the reel-frame an additional adjustment at the inner end. It is one of the objects of my invention to provide means for giving to the inner end of the reel an independent vertical adjustment while still retaining the ordinary adjustment, above mentioned, of the frame and the reel. It is a further object of the invention to provide a novel means for securing to the axle the large gear by which power from the rotating axle is transmitted to the reel-shaft, whereby I am able to use a spur gear and a spur pinion on the main axle and reel-shaft, respectively, instead of the usual bevel gear and pinion. I accomplish these objects as illustrated in the accompanying drawings and as hereinafter described. That which I believe to be new and desire to cover by this application will be set forth in the claims.

In the drawings,—

Figure 1 is a plan view of a rake in which my improvements are embodied;

Fig. 2 is an enlarged detail, being a horizontal central section through the gearing by which the driving of the reel from the axle of the machine is effected;

Fig. 3 is a detail, being an end view of the main drive gear carried by the axle of the machine and the means for vertically adjusting the forward end of the reel-shaft, the view being taken from a plane at right angles to the axis of the reel-shaft;

Fig. 4 is a detail of the clutch carried by the axle of the machine, the two main members of the clutch being shown in engagement with each other;

Fig. 5 is a detail, being a view of the clutch shown in Fig. 4 with the shifting rings removed so that the toothed faces of the clutch members may be seen;

Fig. 6 is a detail, being a section taken at line 6—6 of Fig. 2, and showing the means for effecting the vertical adjustment of the forward end of the reel-shaft; and Fig. 7 is a detail of the gearing carried by the forward or inner head of the rotary reel, and showing also the lever connected to the inner member of the gearing for causing an adjustment of the gears to change the angle of the rake-teeth, said lever being shown in connection with a pivotally-mounted sector.

Referring to the several figures of the drawings, 10—10 indicate a pair of carrying wheels mounted upon an axle 11. Such axle and wheels are ordinarily connected together by any suitable means so that the axle will be caused to rotate upon the forward movement of the machine but not rotate when the machine is backed. Such connecting means may be in the form of any ordinary clutch, such as a pawl and ratchet, indicated at *a* in Fig. 1. As the clutch shown is well known, and forms no part of my invention, I do not deem it necessary to describe it. 12 indicates an ordinary diagonally-disposed reel-frame which is connected with the axle 11 so that when the frame is adjusted relative to its rear ground-engaging supports it will rock about such axle as an axis. In the construction shown the connecting of the frame to the axle is through the medium of a supplemental frame member 13 that is connected to the main frame 12 and has rotatable connection with the axle. The rear ground-engaging supports for the reel-frame may consist of one or two caster-wheels. In the construction shown two such caster-wheels are employed, each indicated by 14—each caster-wheel being mounted in a yoke 15 from which rises a standard 16 that has a sliding connection in bearings carried by an arm 17 projecting rearwardly from the frame. From each standard extends a connection comprising a chain member 18 and a link member 19, the two connections being connected at their forward ends to a common adjusting lever mounted on the usual long truss bar 20 that extends from the wheeled support back and over the reel-frame. The chain members 18 of each connection pass under suitable pulleys journaled on the reel-frame so that when a pull is exerted on the connections the frame will be adjusted vertically relative to the supporting caster-wheels. The details of this frame adjusting mechanism are fully shown and described in the Letters Patent No. 1,313,880, dated August 26, 1919 granted upon the application of one Leon R. Clausen.

The reel that is rotatably mounted in the frame 12 comprises two heads connected together by a plurality of bars to which the rake teeth are connected in the usual manner. The inner or forward one of these reel-heads is indicated by 21 and the other reel-head by 22. As shown, three of the tooth bars mentioned are employed and they are indicated by the numeral 23. The rake-teeth carried by these bars are indicated by 24. The inner or forward head 21 has rotatably secured to its outer face a plurality of sets of gears, the number of sets corresponding in number to the number of the tooth bars 23, and in the outer gear of each set the forward end of one of the tooth bars will be secured as usual. In Fig. 7 an end view of the reel is shown, which also shows the three sets of gears mentioned. The outer gear of each of these sets is indicated by 25 and the gears that are in mesh respectively with these outer gears are indicated by 26, each of these latter gears being journaled upon a pin 27 made fast to the reel-head. Each of the gear members 26 is in mesh with a smaller central gear 28, which is normally held fixed against rotation, but which by reason of being mounted on a cylindrical hub member, as shown, may be rocked in order to effect a change in the position of the several tooth bars so as to incline the teeth 24 carried by such bars to the extent desired. In said Fig. 7 there is shown a lever and a movable sector construction by the use of which this rocking of the central gear may be accomplished. The lever is indicated by 29 and is rigidly affixed to the central gear 28 at its inner end, and at its outer end portion it extends alongside of the sector so as to be locked thereto at any desired point by means of an ordinary spring latch (not shown) carried by the lever. The notched sector referred to is indicated by 30 and is pivotally attached at 31 to the front bar of the reel frame 12. This lever and pivoted sector construction is set forth more in detail in Letters Patent No. 1,283,674, dated November 5, 1918, granted upon the application of said Leon R. Clausen.

32 indicates the usual central shaft of the reel, and upon which the reel-heads 21 and 22 are suitably secured so as to turn therewith, said shaft being preferably angular in cross-section. The outer end bearing will receive the shaft so as to permit of a rising and falling movement of the shaft by power applied to the inner end thereof as herein described, in order that the inner end of the reel may be vertically adjusted independently of the adjustment given to it by the movement of the frame and reel together. In order to effect this independent vertical adjustment of the forward or inner end of the reel shaft, such inner end is journaled so as to be movable up and down and be held in different positions in a vertically slotted bracket depending from the framework. The slotted bracket referred to is indicated by 33 and the wide vertical slot therein by 34. Near the forward end of the reel-shaft and mounted upon it so as to turn therewith is a spur pinion 35 having an extended hub portion 36 that projects through the slot 34 in the bracket 33, and upon this hub portion 36 is journaled a pinion 37 having teeth which engage with rack teeth formed on the forward edge of the slot 34, the rack so formed being indicated by 38. The pinion 37 has only a portion of its periphery provided with teeth inasmuch as the rack 38 is a short one. Such pinion, therefore, may be termed a mutilated pinion. The untoothed portion of the circumference of the hub member 36 within the slot bears against the opposite edge wall of the slot, thus insuring its teeth being kept in constant mesh with the rack 38. As shown, this rack is slightly curved throughout its length which is for the purpose of carrying the pinion 35 slightly forward bodily when the reel-shaft is raised, and thus insuring it remaining in proper engagement with the gear that drives it, which gear will be hereinafter referred to. Such slight forward and back movement of the reel-shaft to insure this engagement of the pinion 35 with its driving gear will be permitted by reason of the looseness of fit hereinbefore referred to of the rear end of the reel-shaft in its bearing, and such slight forward and back movement of the shaft at the same time that it is raised and lowered will not be of sufficient extent to in any wise impair the efficiency of the reel with respect to its raking function. The raising and lowering of the inner or forward end of the reel-shaft is accomplished through the medium of an adjusting lever 39, which, as best shown in Fig. 3, is bolted to an arm 39ª formed integral with an annular flange on the outer end of the mutilated pinion 37, the flange referred to resting against a rib formed on the outer face of the bracket 33 around the longitudinal slot 34. As this lever is turned it is evident that through the meshing of the teeth of the mutilated pinion 37 with the rack 38 the shaft must be vertically adjusted up or down according to the direction in which the lever is moved, and when adjusted to the desired position it can be retained in that position by reason of the engagement of the lever with any one of the notches of an ordinary segment 40 that is secured to the outer face of the reel-frame, the engagement of the lever with the segment being by means of an ordinary spring latch (not shown) carried by the lever. 41 indicates a washer on the outer end of the reel-shaft and held in place by a cotter pin, as shown. 42 indicates a sleeve member shaped to fit over the reel-shaft 32 and extending between the pinion 35 and the hub of the outer reel-head 21 and serving merely as a spacing device between those two parts.

43 indicates a sleeve mounted loosely on the axle 11 and connected with the reel-frame, in the construction shown by an arm 44 cast integral with the slotted bracket 33. 45 indicates a bearing on the sleeve 43 and preferably integral therewith, which is at such an angle to the axis of the sleeve 43 as to receive thereon and properly support, so as to be in direct alinement with the pinion 35, a driving gear 46. As shown, one edge of the hub portion of this gear rests against a shoulder, and opposite its other edge is bolted a removable plate 48, and thus it will be seen that by means of the shoulder and the plate the gear is properly held upon the bearing 45 and can rotate freely thereon. This arrangement of the large driving gear, it will be seen, brings its axis approximately parallel with the axis of the reel-shaft. The inner face of this gear 46 is provided with an annular row of bevel teeth 47 with which meshes the teeth of a bevel gear 49 loose on the axle 11. This bevel gear 49 has, as best shown in Fig. 2, an extended hub member 50, and upon this hub is mounted one member of a two-part clutch, such clutch member being indicated by 51. This clutch member 51 is grooved to receive a longitudinal fin 52 on the hub 50, and thus the clutch member 51 is slidingly but non-rotatably secured to such hub. The outer portion of the clutch member 51 is provided with an annular recess 53 in which are located two or more coiled springs 54 that bear at one end against the face of the bevel gear 49 and at their other end bear against the clutch member 51, such springs tending, of course, to keep the clutch member 51 forced toward its coacting member, the latter being indicated by 55 and being fixedly connected by a pin 56, or otherwise, to the axle 11. The opposing faces of the clutch members 51 and 55 will be provided with engaging teeth or portions, as usual, so that during the forward movement of the machine the clutch will be so engaged with the rotating axle as to cause a driving of the bevel gear 49, and through such gear drive the large inclined spur gear 46, as before explained. When, however, it is desired to stop the rotation of the reel, the clutch members will be separated by a pull on a handle 57 that is attached to a ring 58 loosely mounted on a recessed end portion of the clutch member 51, which ring bears against another ring 59 similarly mounted on the clutch member 55 and held against rotation by a brace 60 connected with the frame. As clearly shown in Fig. 4, the contacting faces of these rings are formed with complementary inclined and straight portions so that as the lever 57 is pulled up the riding of one inclined face on the other will necessarily separate the clutch, and after the inclined face of the member 58 has passed beyond the correspondingly inclined face on the other member two straight faces will be in contact and thus effectually hold the two clutch members separated and inoperative, which position can be retained if desired by the operator locking the lever to a notched segment, as usual. Upon a reverse stroke of the lever 57 the two parts of the clutch will again assume interlocking position, the springs 54 assisting in moving the member 51 toward the other member and thereafter acting to hold it in clutching position.

In operation, with the machine moving forward over a field the reel will be rotated from the axle by reason of the intermeshing of the gear 46 on the axle 11 with the pinion 35 on the reel-shaft 32, the large gear 46 being rotated freely on its inclined axis by reason of the engagement of the bevel teeth 47 on its face with the bevel pinion 49 on said axle. By reason of this arrangement of the driving gearing I am able to use a spur gear and pinion on the axle and reel-shaft, respectively, instead of the usual bevel gears, and thereby avoid the lateral strain on the gearing incident to the use of bevel gearing. When it is desired to effect a vertical adjustment of the reel-frame with respect to its rear ground-engaging supports the same can be effected by a stroke of the lever to which the said ground-engaging supports are connected by the chain and link devices 18—19, all as fully set forth in the said Clausen Patent No. 1,313,880. If in addition to such adjustment a separate raising or lowering of the reel itself be desired such independent adjustment can be had by manipulating the lever 39 so as to cause a turning of the mutilated pinion 37—such turning causing a raising or lowering of the pinion and the reel-shaft supported therein on account of the engagement of the teeth of such pinion with the fixed rack 38, as will be understood. As before stated, and as clearly shown in Fig. 6, the rack 38 is slightly curved, and by reason thereof the reel-shaft will during its rising and falling operation be also moved slightly back and forth so as to insure the teeth of the pinion 35 being kept in mesh with the teeth of the gear 46. Regardless of the extent to which the reel-frame may be adjusted as described or to which the reel itself may be independently adjusted, the means for holding the gearing on the inner reel-head normally locked in place so as to preserve the various teeth in the required positions will not be found to offer any interference to such adjusting movements because the sector 30 to which the gear adjusting lever 29 is in engagement can and will always turn on its pivot to allow for such frame and reel adjustments.

What I claim as my invention and desire to secure by Letters Patent, is—

1. In a rotary rake, the combination of a wheeled support comprising a rotating axle, a diagonally-extending frame connected at its forward portion with said wheeled support, a rotatable reel carried by said frame, and a reel-driving rotatable member on said axle, the axis of said driving member being approximately parallel with the axis of the reel.

2. In a rotary rake, the combination of a wheeled support comprising a rotating axle, a diagonally-extending frame connected at its forward portion with said wheeled support, a rotatable reel carried by said frame, a driving member on said axle arranged at an angle to the axle, means for causing said driving member to rotate with the axle, and means carried by the reel and driven from said angularly-disposed driving member.

3. In a rotary rake, the combination of a wheeled support comprising a rotating axle, a diagonally-extending frame connected at its forward portion with said wheeled support, a rotatable reel carried by said frame, a driving member on said axle arranged at an angle to the axle, means for rotating said member from the axle, and means carried by the reel and driven from said angularly-disposed driving member.

4. In a rotary rake, the combination of a wheeled support comprising a rotating axle, a diagonally-extending frame connected at its forward portion with said wheeled support, a rotatable reel carried by said frame and comprising a shaft rotatably mounted in said frame, a spur pinion affixed to said shaft, and a spur gear mounted at an angle on the axle and driven therefrom and in mesh with said pinion.

5. In a rotary rake, the combination of a wheeled support comprising a rotating axle, a diagonally-extending frame connected at its forward portion with said wheeled support, a rotatable reel carried by said frame and comprising a shaft rotatably mounted in said frame, a gear-member affixed to said shaft, a sleeve non-rotatably mounted on the axle and provided with an inclined bearing, a reel-driving member rotatably mounted on said inclined bearing and in operative connection with the gear member on the reel-shaft, and means on the axle for driving said reel-driving member.

6. In a rotary rake, the combination of a wheeled support comprising a rotating axle, a diagonally-extending frame connected at its forward portion with said wheeled support, a rotatable reel carried by said frame and comprising a shaft rotatably mounted in said frame, a gear-member affixed to said shaft, a sleeve non-rotatably mounted on the axle and provided with an inclined bearing, a reel-driving member rotatably mounted on said inclined bearing and in operative connection with the gear member on the reel-shaft, and clutch-controlled means on the axle for driving said reel-driving member.

7. In a rotary rake, the combination of a wheeled support comprising a rotating axle, a diagonally extending frame having its forward portion connected with said wheeled support, a rotatable reel carried by said frame and comprising a shaft, a gear member affixed to said shaft, a reel-driving rotatable member on said axle in operative connection with the gear member on the reel-shaft, the axis of said rotatable member being approximately parallel with the axis of the reel-shaft and said member having an annular row of bevel teeth on one face, and a bevel gear mounted on and rotatable with said axle and meshing with said annular row of bevel teeth.

8. In a rotary rake, the combination of a wheeled support comprising a rotating axle, a diagonally extending frame having its forward portion connected with said wheeled support, a rotatable reel carried by said frame and comprising a shaft, a gear member affixed to said shaft, a reel-driving rotatable member on said axle in operative connection with the gear member on the reel-shaft, the axis of said rotatable member being approximately parallel with the axis of the reel-shaft and said member having an annular row of bevel teeth on one face, a bevel gear mounted on and rotatable with said axle and meshing with said annular row of bevel teeth, and clutch-controlled means on the axle for connecting said bevel gear with the axle.

9. In a side-delivery rotary rake, the combination of a wheeled support comprising a rotating axle, a diagonally-extending frame pivotally connected at its forward portion with said wheeled support, a rotatable reel carried by said frame and comprising a shaft journaled in said frame, a gear member affixed to said shaft, a second gear member rotatably supported in an inclined position by said axle so that its axis is approximately parallel with the axis of the reel-shaft, said two gear members being operatively connected with each other, means for driving said second-named gear member from the said axle, and means for vertically adjusting said frame and reel without disengaging said gear members from operative connection with each other.

10. In a side-delivery rotary rake, the combination of a wheeled support comprising a rotating axle, a diagonally-extending frame pivotally connected at its forward portion with said wheeled support, a rotatable reel carried by said frame and comprising a shaft journaled in said frame, a gear member affixed to said shaft, a second gear member rotatably supported in an inclined position by said axle so that its axis is approximately parallel with the axis of the reel-shaft, said two gear members being operatively connected with each other, means for driving said second-named gear member from the said axle, and means for applying power to the inner end of the reel to adjust the same vertically without disengaging said gear members from operative connection with each other.

11. In a side-delivery rotary rake, the combination of a wheeled support comprising a rotating axle, a diagonally-extending frame pivotally connected at its forward portion with said wheeled support, a rotatable reel carried by said frame and comprising a shaft journaled in said frame, a gear member affixed to said shaft, a second gear member rotatably supported in an inclined position by said axle so that its axis is approximately parallel with the axis of the reel-shaft, said two gear members being operatively connected with each other, means for driving said second-named gear member from the said axle, and means for adjusting the inner end of the reel vertically and at the same time moving it forwardly to maintain the two gear members in operative connection with each other.

12. In a side-delivery rotary rake, the combination of a wheeled support comprising a rotating axle, a diagonally-extending frame pivotally connected at its forward portion with said wheeled support, a rotatable reel carried by said frame and comprising a shaft journaled in said frame, a gear member affixed to said shaft, a second gear member rotatably supported in an inclined position by said axle so that its axis is approximately parallel with the axis of the reel-shaft, said two gear members being operatively connected with each other, means for driving said second-named gear member from the said axle, and means for applying power to the inner end of the reel to adjust the same vertically without disengaging said gear members from operative connection with each other, said adjusting means comprising a toothed rotatable member on the reel-shaft, a fixed rack with which said toothed member engages, and means for turning said toothed member to cause it to travel up or down on said rack.

13. In a side-delivery rotary rake, the combination of a wheeled support comprising a rotating axle, a diagonally-extending frame pivotally connected at its forward portion with said wheeled support, a rotatable reel carried by said frame and comprising a shaft journaled in said frame, a gear member affixed to said shaft, a second gear member rotatably supported in an inclined position by said axle so that its axis is approximately parallel with the axis of the reel-shaft, said two gear members being operatively connected with each other, means for driving said second-named gear member from the said axle, and means for adjusting the inner end of the reel vertically and at the same time moving it forwardly to maintain the two gear members in operative connection with each other, said adjusting means comprising a toothed rotatable member on the reel-shaft, a fixed inclined rack with which said toothed member engages, and means for turning said toothed member to cause it to travel up or down on said rack.

14. In a rotary rake, the combination of a frame, a rake-reel having a shaft journaled in the frame, a slotted bracket carried by the frame, an inclined rack on said bracket, a toothed rotatable member located in the slot in the bracket and rotatably supporting said shaft and being in engagement with said rack, a lever connected with said rotatable member for moving it along said rack to cause a simultaneous adjustment in two directions of the reel-shaft, a wheeled support with which the forward end portion of the reel-frame is pivotally connected, and alined gear members carried by the reel-shaft and the axle of the wheeled support, respectively, said gear members being in constant operative connection with each other.

ROBERT R. BOWERS.